Sept. 10, 1968    D. COLLINS    3,400,860
SHAKER TYPE DISPENSER

Filed May 25, 1967    2 Sheets-Sheet 1

Inventor:
Douglas Collins
By Baldwin Wight Diller & Brown
Attorneys

United States Patent Office 3,400,860
Patented Sept. 10, 1968

3,400,860
SHAKER TYPE DISPENSER
Douglas Collins, London, England, assignor to Sutton and Sons Limited, Reading, Berkshire, England, a corporation of the United Kingdom
Filed May 25, 1967, Ser. No. 641,311
Claims priority, application Great Britain, June 29, 1966, 29,208/66
4 Claims. (Cl. 222—184)

ABSTRACT OF THE DISCLOSURE

A dispenser for distributing manually powder, seeds, granules or other particulate material, comprising a hand held hopper, one or more orificies of substantial size in the base of the hopper, a disc member beneath and parallel to the base of the hopper and underlying the orificies, the disc member being restrained from free rotation relative to the hopper, and means whereby the distance between the disc and the base of the hopper may be varied from a minimum of zero. Preferably screw means are provided for varying this distance, and an outwardly extending depending skirt surrounds the base of the hopper.

---

Figure 1:
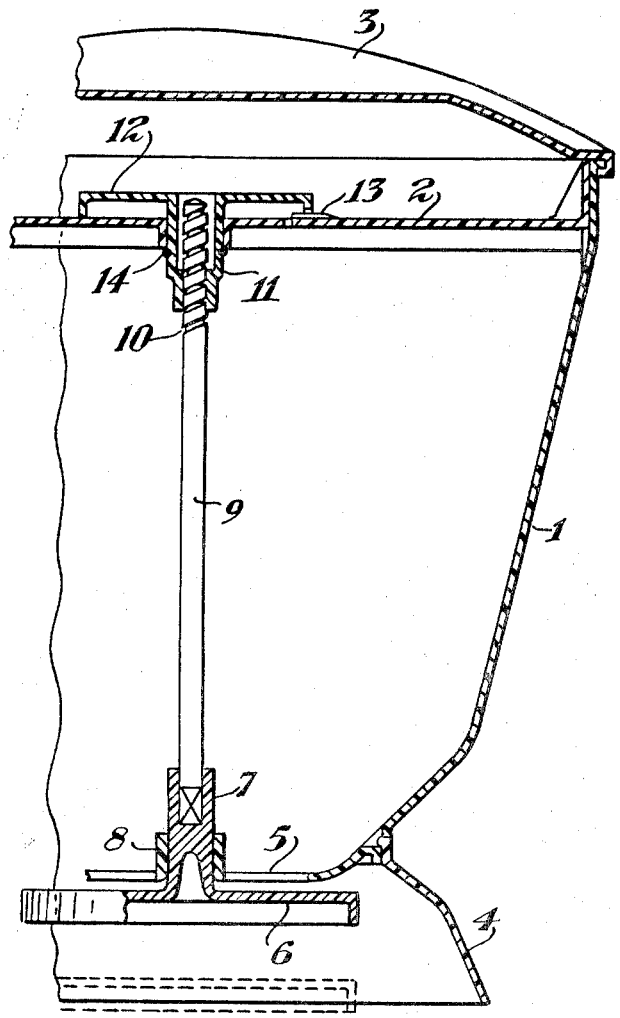

This invention relates to a dispenser for distributing manually powders, seeds, granules or other particulate material in an even manner over an area beneath the dispenser. The dispenser of the invention is particularly adapted for use in the distribution of seeds and dressings in horicultural applications.

It is found that dispensers for such materials depending on a simple perforated plate for dispensing are unsatisfactory in that the perforations are liable to clogging giving rise to erratic distribution and requiring excessive effort on the part of the user; moreover it is difficult to provide for a continuous range of adjustment of perforation size.

Dispensers are also known making use of a mechanically rotated disc for spreading, but the necessity for providing means to rotate the disc relative to the dispenser during use produces a complicated apparatus which is not economical for small scale use.

It is the object of the present invention to provide a dispenser which will not be subject to clogging, can readily be adjusted to suit the rate of dispensing required or the particle size of the material being dispensed, and which will be simple and cheap in construction.

Accordingly the invention provides a dispenser for distributing particulate materials, such as powder, granules and seeds, comprising a hopper, at least one orifice of substantial size in the base of the hopper, and a disc member beneath and parallel to the base of the hopper, said disc member underlying and being of greater extent than the total area of orifice in the base of the hopper, characterized by the provision of a handle fast to said hopper whereby the latter may be suspended from the hand of a user, a member extending from the disc member upwardly through the base of the hopper and located relative to the hopper against free rotational movement, and means adjustably locating said upwardly extending member axially relative to the hopper whereby the distance between the disc member and the base of the hopper may be varied from a minimum of zero.

Preferably, the hopper is of bucket or conical shape, and the orifices are several in number and of segmental shape distributed over a circular area around the centre of the base of the hopper, which base is surrounded by an outwardly extending depending skirt. Preferably also the disc is supported by screw means which may comprise a vertical column located in the middle of the base to permit axial movement but restrained from rotational movement relative to the latter, the column having a screw thread engaging a complementary thread associated with a rotatable hand-wheel or knob located at the top of the hopper and restrained against axial movement. Although alternative means of supporting the disc could be employed in which the disc turns relative to the hopper during adjustment, the disc must not be allowed to rotate freely during dispensing.

Figure 2:
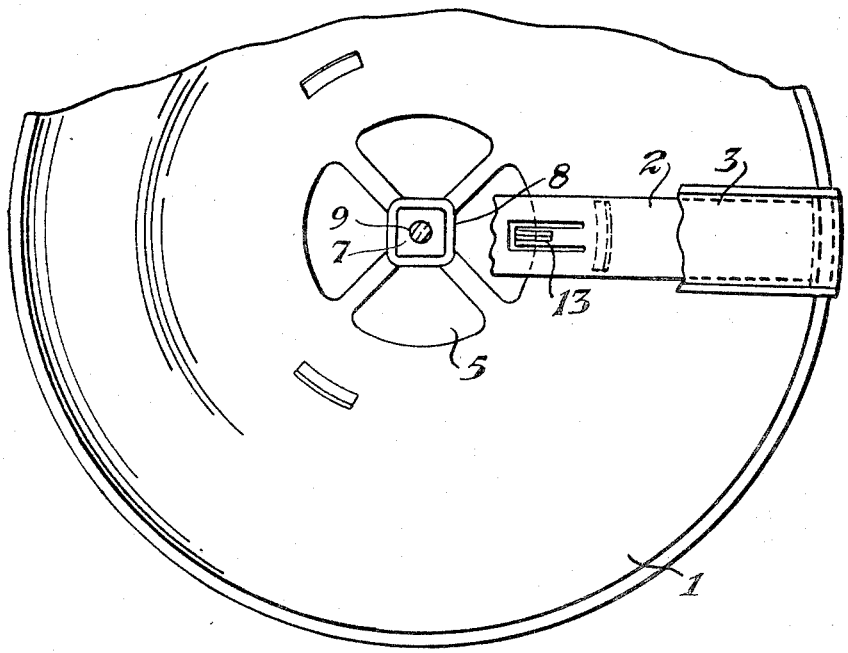

An exemplary embodiment of the invention is illustrated in the accompanying drawings in which:

FIGURE 1 is a part vertical section of a dispenser, and
FIGURE 2 is a part plan view of the base of the hopper.

The dispenser comprises a bucket or conical shaped hopper 1, open at the top and bridged by a bridge member 2 and a carrying handle 3. Extending around the base of the hopper is an outwardly extending depending skirt 4, whilst the base of the hopper is provided with a number of substantially sized segmental orifices 5. Beneath the base of the hopper is a disc 6 of somewhat greater diameter than that of the area containing the wedge shaped orifices, this disc being supported by a square column 7. The column 7 passes through a square locating member 8 in the base of the hopper, being free to slide axially in the member but being restrained against rotational movement therein. It should be appreciated that the column 7 and member 8 may be of other shapes than square, so long as they cooperate to restrain rotational movement of the column 7.

The column has an upward extension 9 provided at its upper end with a coarse thread 10 engaging a complementary internal thread in a downward extension 11 of a knob or handwheel 12 journalled in the bridge member 2 and restrained against axial movement by a circlip 14. A click-stop member 13 may be provided on the bridge to engage a notch or notches on the hand-wheel in order to give an indication of the number of rotations or part rotations imparted to the column.

In operation, the hopper is filled with the material to be dispensed, for example powdered or granulated fertiliser or grass seed, the hand-wheel 12 having been operated to turn the extension 11 and raise the disc 6 against the base of the hopper. During this operation, and whenever the dispenser is not in use, the skirt 4 provides a stable support. The hand-wheel 12 is then rotated a number of turns sufficient to drop the disc a sufficient distance beneath the orifices 5 to provide a gap between the disc 6 and the base of the hopper. Since the disc is larger than the area of the orifices, although the material to be dispensed may flow through them to a certain extent, it will lie naturally on the disc and will not escape. The dispenser is held by the handle 3 and a reciprocatory rotational movement imparted thereto by hand by a natural wrist movement. This throws powder from the disc outwardly and it is distributed downwards by the skirt to produce an even distribution of material. After use, the disc 6 may be drawn up against the base to close the orifices 5 by rotation of the hand-wheel.

Any material of suitable tensile strength can be used for making the dispenser, but it is preferred that the hopper, skirt, bridge member and control knob should be made of synthetic plastic material, as can also the disc and the column and even the screw. The hopper is preferably provided with markings or graduations indicating its content of the material to be dispensed.

I claim:
1. A hand dispenser for distributing particulate material, such as powder, granules and seeds, and wherein dispensing is effected by manual rotational movement of the entire dispenser, said dispenser comprising a hopper having a normally horizontal flat base, at least one dispensing orifice of substantial size in said base, a generally flat disc member positioned beneath and parallel to said base for selective cooperation with said base to seal said orifice and reception of particulate material passing through said orifice, said disc member underlying and being of such greater extent than the total area of said orifice that material passing through said orifice by gravity will lie naturally on said disc member and reside thereon as long as said dispenser is stationary, a handle fixed to said hopper for facilitating the suspension and dispensing movement of said dispenser by hand, a member fixed to said disc member and extending upwardly through said base and fixed against rotational movement, and locating means secured to said upwardly extending member and adjustably vertically locating said upwardly extending member and said disc member relative to said base for selectively changing the vertical relation of said disc member and said base.

2. A dispenser according to claim 1 wherein said upwardly extending member is in the form of a column located in the center of said base, said base having an upstanding tubular locating member receiving said upwardly extending member in freely vertically slidable nonrotating relation; and said locating means including an upwardly directed extension of said upwardly directed member having at the upper end there a screw thread, a hand wheel carried by an upper portion of said hopper and fixed against downward movement, and a threaded member carried by said hand wheel threadedly engaging said screw thread.

3. A dispenser according to claim 2 wherein said dispenser includes a depending skirt secured to a lower portion of said hopper in surrounding spaced relation to said disc member, said skirt being in the form of a deflector for material moving radially off of said disc member when said dispenser is rotated.

4. A dispenser according to claim 1 wherein said dispenser includes a depending skirt secured to a lower portion of said hopper in surrounding spaced relation to said disc member, said skirt being in the form of a deflector for material moving radially off of said disc member when said dispenser is rotated.

References Cited

UNITED STATES PATENTS

| | | | |
|---|---|---|---|
| 588,045 | 8/1897 | Anderson | 222—510 |
| 1,237,702 | 8/1917 | Root | 222—510 X |
| 2,600,131 | 6/1952 | Schwarm et al. | 222—510 X |

ROBERT B. REEVES, *Primary Examiner.*

H. S. LANE, *Assistant Examiner.*